United States Patent
Zander (10) Patent No.: US 7,162,826 B1
(45) Date of Patent: Jan. 16, 2007

(54) FISH LOSS PREVENTION SYSTEM

(76) Inventor: Allen E. Zander, 217 11th St. NW., Devils Lake, ND (US) 58301; by Lois J. Zander, legal representative, 217 11th St. NW., Devils Lake, ND (US) 58301

( * ) Notice: Subject to any disclaimer, the term of this patent is extended or adjusted under 35 U.S.C. 154(b) by 0 days.

(21) Appl. No.: 11/195,230

(22) Filed: Aug. 1, 2005

(51) Int. Cl.
*A01K 97/01* (2006.01)
*A01K 69/00* (2006.01)

(52) U.S. Cl. .......................................... 43/4
(58) Field of Classification Search .................. 43/4, 43/12; 294/535; 210/470; 248/513, 533
See application file for complete search history.

(56) References Cited

U.S. PATENT DOCUMENTS

| | | | | |
|---|---|---|---|---|
| 2,876,974 A * | 3/1959 | Liftman | ...................... | 248/533 |
| 3,289,850 A | 12/1966 | Gubash | ...................... | 210/470 |
| 3,722,940 A * | 3/1973 | Misjak | ...................... | 294/1.1 |
| 3,747,253 A * | 7/1973 | Gangi et al. | ...................... | 43/4 |
| 4,769,939 A * | 9/1988 | Gonska et al. | ...................... | 43/4 |
| 4,866,872 A * | 9/1989 | Guilbault et al. | ................ | 43/4 |
| 4,978,156 A * | 12/1990 | Marhula | ...................... | 294/1.1 |
| 5,048,220 A * | 9/1991 | Harris | ...................... | 43/4 |
| 5,072,538 A * | 12/1991 | Hendricks et al. | ............... | 43/4 |
| 5,140,767 A * | 8/1992 | Traut | ................. | 43/4 |
| 5,218,777 A * | 6/1993 | Olszowka et al. | ............... | 43/5 |
| 5,784,824 A * | 7/1998 | Myroniuk | ......................... | 43/4 |
| 6,412,213 B1 | 7/2002 | Wellard | ......................... | 43/12 |
| 6,568,120 B1 * | 5/2003 | Smolinski | ......................... | 43/5 |
| 6,615,533 B1 | 9/2003 | Wellard | ......................... | 43/12 |
| 6,684,553 B1 * | 2/2004 | Holum | .............................. | 43/4 |

* cited by examiner

*Primary Examiner*—Kurt Rowan (57) ABSTRACT

A fish loss prevention system for preventing the loss of a fish during ice fishing. The fish loss prevention system includes a base positionable in an ice hole, a support member extending upwardly from the base, a shaft slidably attached to the support member, a catch member attached to the support member and selectively engaging the shaft, and a stopper attached to the lower end of the shaft. The user rotates the shaft to block the ice hole after a fish is positioned within the ice hole to prevent the fish from passing out of the ice hole.

18 Claims, 9 Drawing Sheets

FISH LOSS PREVENTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to ice fishing devices and more specifically it relates to a fish loss prevention system for preventing the loss of a fish during ice fishing.

2. Description of the Related Art

Any discussion of the prior art throughout the specification should in no way be considered as an admission that such prior art is widely known or forms part of common general knowledge in the field.

Ice fishing is an increasingly popular sport. Ice fishing involves the drilling of one or more holes into the ice. The ice hole has a diameter sufficient to bring a fish through after being caught. Unfortunately, caught fish sometimes accidentally get off the hook (or intentionally) and pass back through the ice hole. Hence, there is a need for a device that will prevent a caught fish from passing back through an ice hole during ice fishing.

BRIEF SUMMARY OF THE INVENTION

In view of the foregoing disadvantages inherent in the known types of ice fishing devices now present in the prior art, the present invention provides a new fish loss prevention system construction wherein the same can be utilized for preventing the loss of a fish during ice fishing.

The general purpose of the present invention, which will be described subsequently in greater detail, is to provide a new fish loss prevention system that has many of the advantages of the ice fishing devices mentioned heretofore and many novel features that result in a new fish loss prevention system which is not anticipated, rendered obvious, suggested, or even implied by any of the prior art ice fishing devices, either alone or in any combination thereof.

To attain this, the present invention generally comprises a base positionable in an ice hole, a support member extending upwardly from the base, a shaft slidably attached to the support member, a catch member attached to the support member and selectively engaging the shaft, and a stopper attached to the lower end of the shaft. The user rotates the shaft to block the ice hole after a fish is positioned within the ice hole to prevent the fish from passing out of the ice hole.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fish loss prevention system that will overcome the shortcomings of the prior art devices.

A second object is to provide a fish loss prevention system for preventing the loss of a fish during ice fishing.

Another object is to provide a fish loss prevention system that may be utilized in various sizes of ice holes.

An additional object is to provide a fish loss prevention system that assists in retrieving fish without having to utilize danger gaff hooks or extending fingers into a fish's mouth.

A further object is to provide a fish loss prevention system that is easy and efficient to install and operate.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 7b is a side view of the present invention positioned within an ice hole having a second depth greater than the first depth shown in FIG. 7a.

DETAILED DESCRIPTION OF THE INVENTION

A. Overview

Turning now descriptively to the drawings, in which similar reference characters denote similar elements throughout the several views, FIGS. 1 through 8 illustrate a fish loss prevention system 10, which comprises a base 20 positionable in an ice hole 12, a support member 30 extending upwardly from the base 20, a shaft 60 slidably attached to the support member 30, a catch member 40 attached to the support member 30 and selectively engaging the shaft 60, and a stopper 70 attached to the lower end of the shaft 60. The user rotates the shaft 60 to block the ice hole 12 after a fish 14 is positioned within the ice hole 12 to prevent the fish 14 from passing out of the ice hole 12.

B. Base

FIGS. 1 through 7c illustrate the base 20 of the present invention. The base 20 is positionable within an ice hole 12 as best illustrated in FIGS. 5a through 7c of the drawings.

Figure 1:
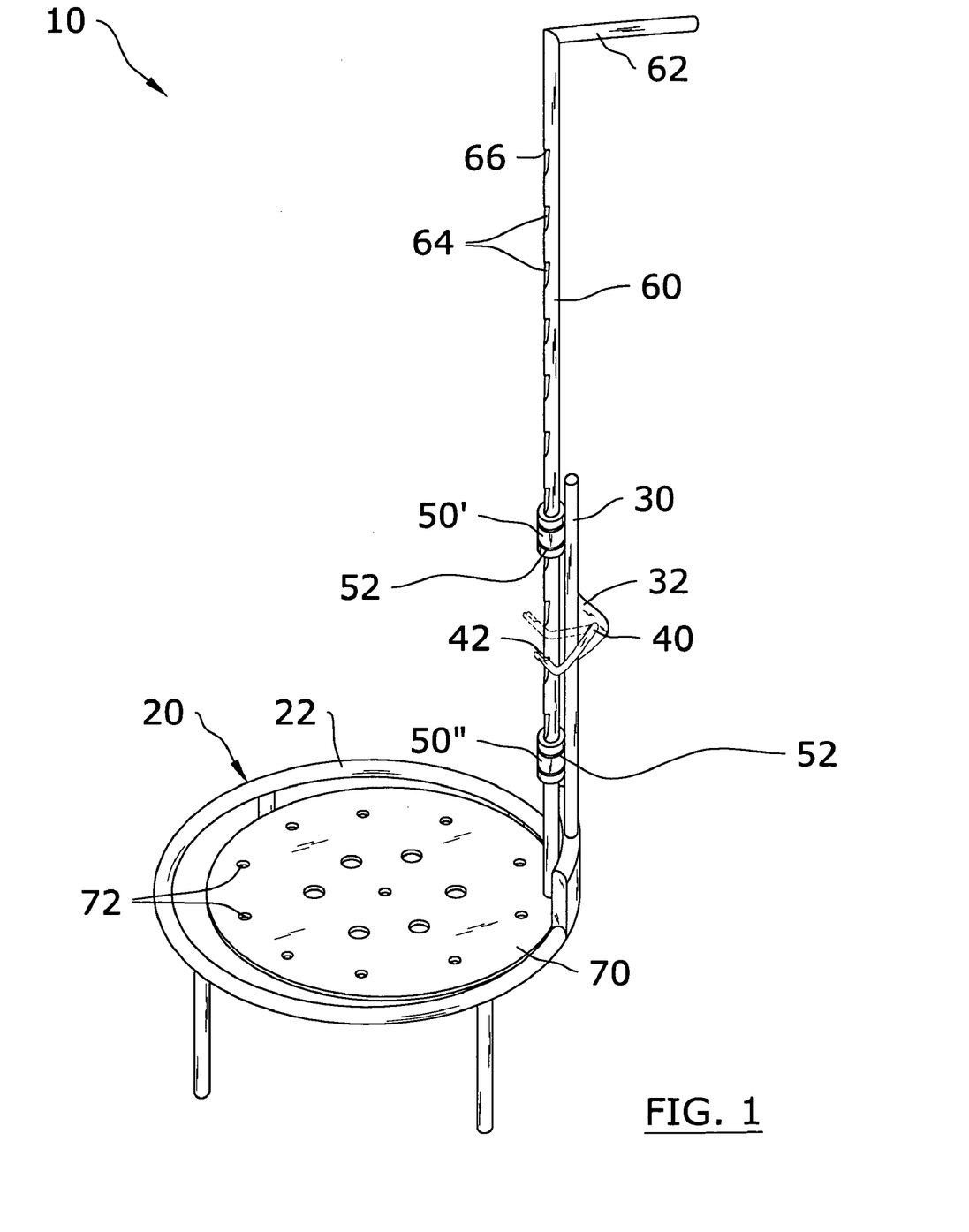
FIG. 1 is an upper perspective view of the present invention.
Figure 2:
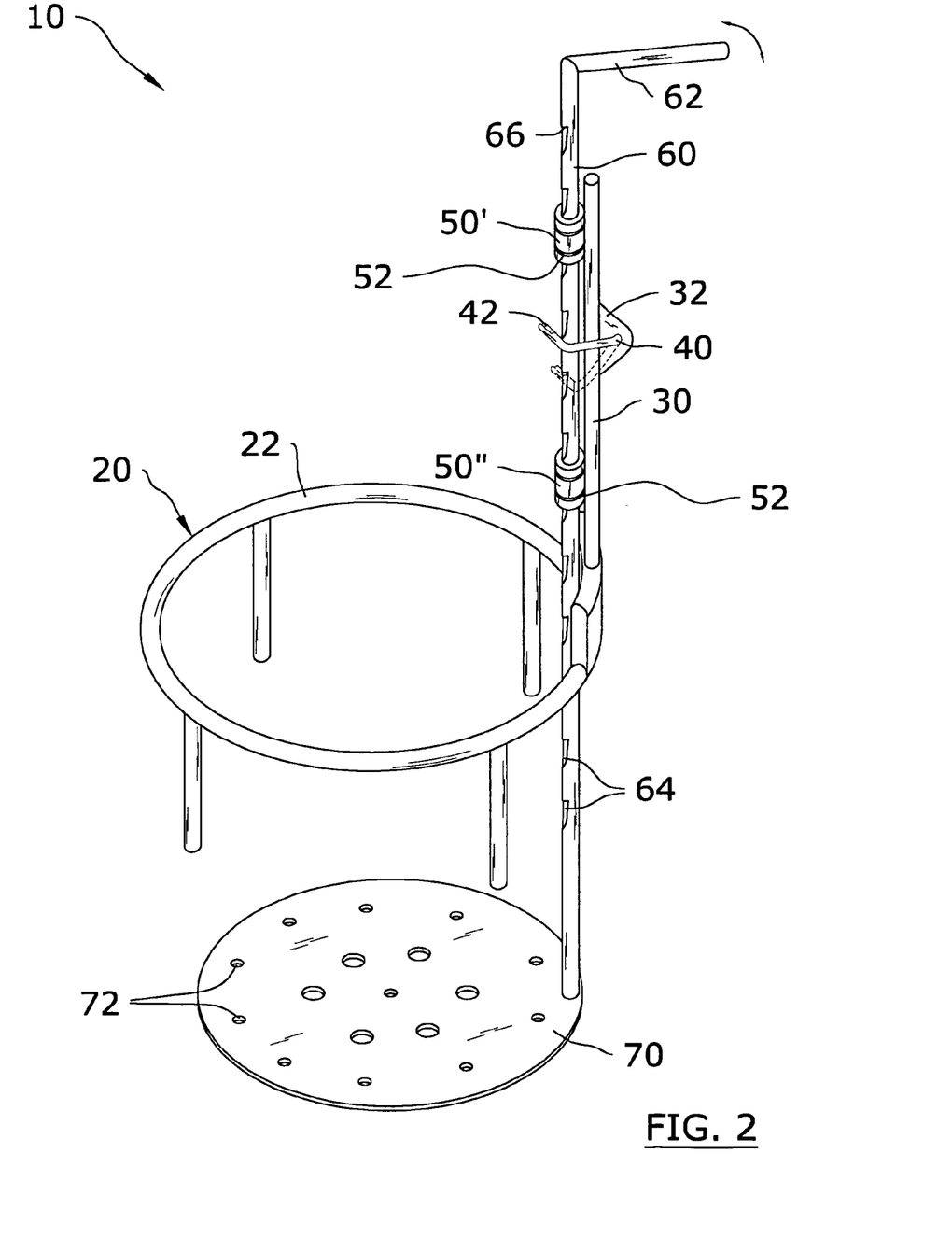
FIG. 2 is an upper perspective view of the present invention with the stopper partially lowered with respect to the base.

The base 20 preferably includes a ring 22 and a plurality of prongs 24 extending downwardly from the ring 22 as shown in FIGS. 1 and 2 of the drawings. The prongs 24 are extendable into an ice hole 12 for engaging the inner wall of the ice hole 12 as shown in FIGS. 5a through 7c of the drawings. The ring 22 preferably has an outer diameter greater than an inner diameter of an ice hole 12 positioned about so that the base 20 does not fall completely into the ice hole 12. The ring 22 preferably has a circular shape as shown in FIGS. 1 and 2 of the drawings.

C. Support Member

The support member 30 extends upwardly from the base 20 as illustrated in FIGS. 1 and 2 of the drawings. The support member 30 may have various structures other than illustrated in the drawings.

As shown in FIGS. 1 and 2 of the drawings, at least one guide member 50' 50" is attached to the support member 30. It is preferably that an upper guide member 50' and a lower guide member 50" be utilized to provide additional support to the shaft 60 during usage. The guide members 50', 50" preferably each include a rubber seal 52 or similar structure on an interior portion thereof that receives the shaft 60 for preventing the accumulation of water and ice on the shaft 60 during usage.

FIGS. 1 through 4 illustrate a bracket 32 attached to the support member 30. The bracket 32 pivotally supports the catch member 40 so that the catch member 40 may catchably retain the shaft 60 in the desired vertical position.

D. Shaft

The shaft 60 is slidably and rotatably attached to the guide members 50 as shown in FIGS. 1 and 2 of the drawings. The shaft 60 preferably extends substantially vertically when the base 20 is positioned within an ice hole 12 as illustrated in FIGS. 5b through 7c of the drawings. The shaft 60 preferably includes a handle 62 extending from an upper end of the shaft 60 as further shown in FIGS. 1 and 2 of the drawings.

Figure 5A:
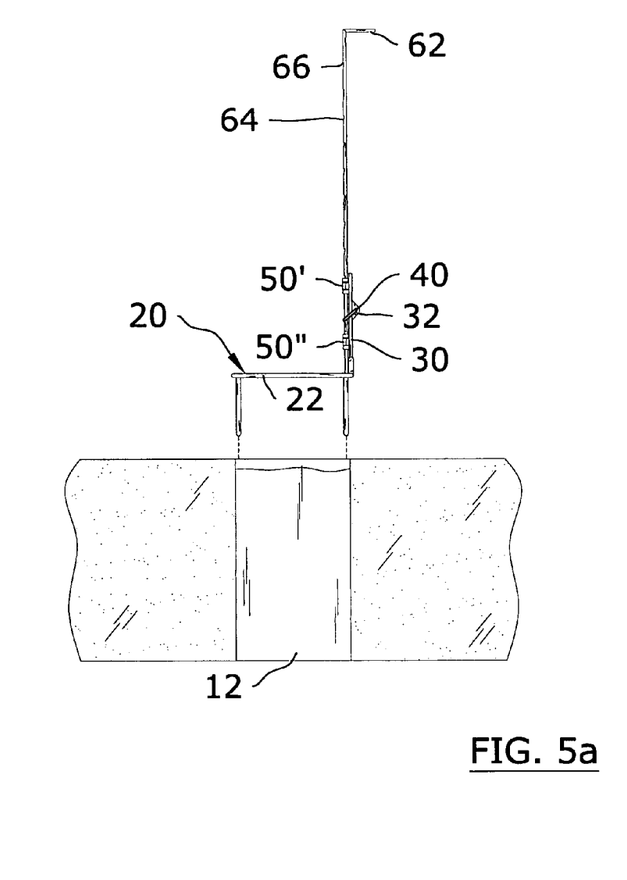
FIG. 5a is an exploded side view of the present invention above an ice hole.
Figure 5B:
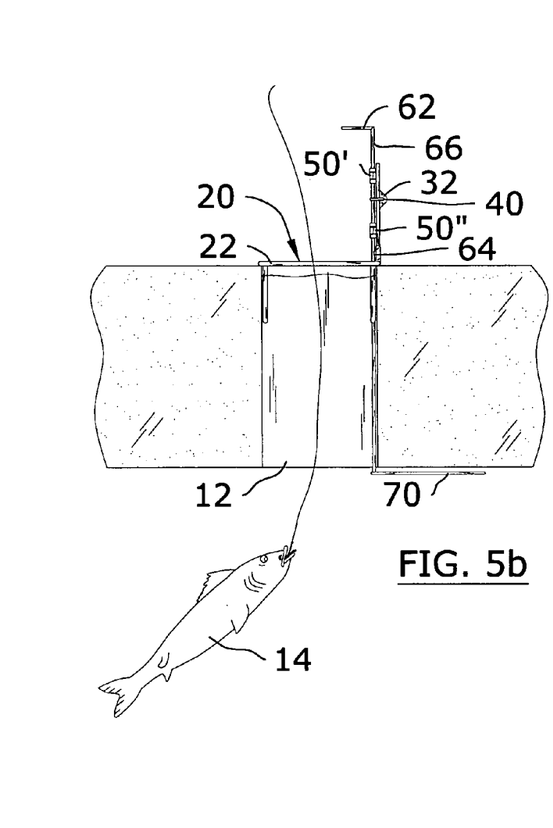
FIG. 5b is a side view of the present invention positioned within an ice hole with the stopper in the open position.
Figure 5C:
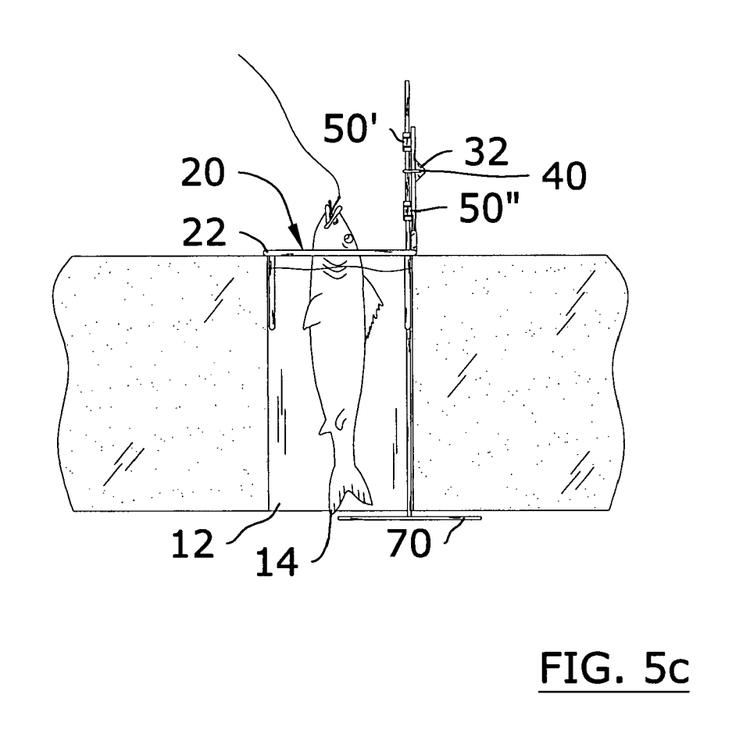
FIG. 5c is a side view of the present invention positioned within an ice hole with the stopper in a partially closed position to retain a fish in the ice hole.
Figure 5D:
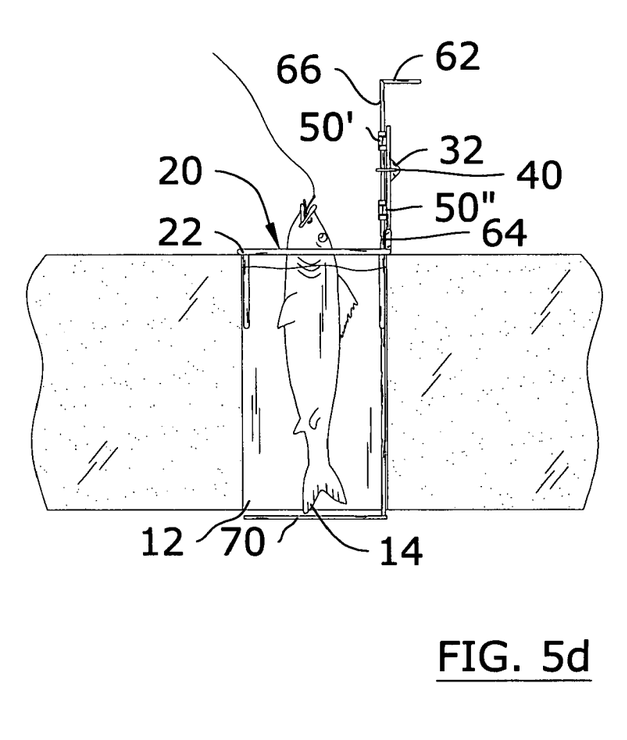
FIG. 5d is a side view of the present invention positioned within an ice hole with the stopper in a closed position to retain a fish in the ice hole.

The shaft 60 preferably has a plurality of catch notches 64 for the catch member 40 to selectively catch upon thereby preventing the shaft 60 from extending downwardly further than intended. It is desirable to have the stopper 70 positioned just a little below the lower surface of the ice as best illustrated in FIGS. 5b through 5d of the drawings. The plurality of catch notches 64 each preferably taper upwardly and inwardly with a ceiling 66 at an upper end thereof as illustrated in FIGS. 1 and 2 of the drawings.

E. Catch Member

The catch member 40 is pivotally attached to the bracket 32 as shown in FIGS. 1 through 4 of the drawings. The catch member 40 selectively engages the shaft 60 to prevent the shaft 60 from accidentally lowering 22 the stopper 70.

The catch member 40 preferably has a jaw 42, wherein the jaw 42 is capable of catchably engaging one of the plurality of catch notches 64 as illustrated in FIGS. 1 and 2 of the drawings. More particularly, the jaw 42 is capable of catchably engaging the ceiling 66, of the catch notches 64 as the ceiling 66 has a substantially horizontal structure which does not allow the shaft 60 to pass downwardly unless rotated to a proper position for lowering 22 the shaft 60. More particularly, the catch member 40 allows the shaft 60 to be lowered when the catch member 40 is extended outwardly so as to not engage said catch notches 64.

Figure 3:
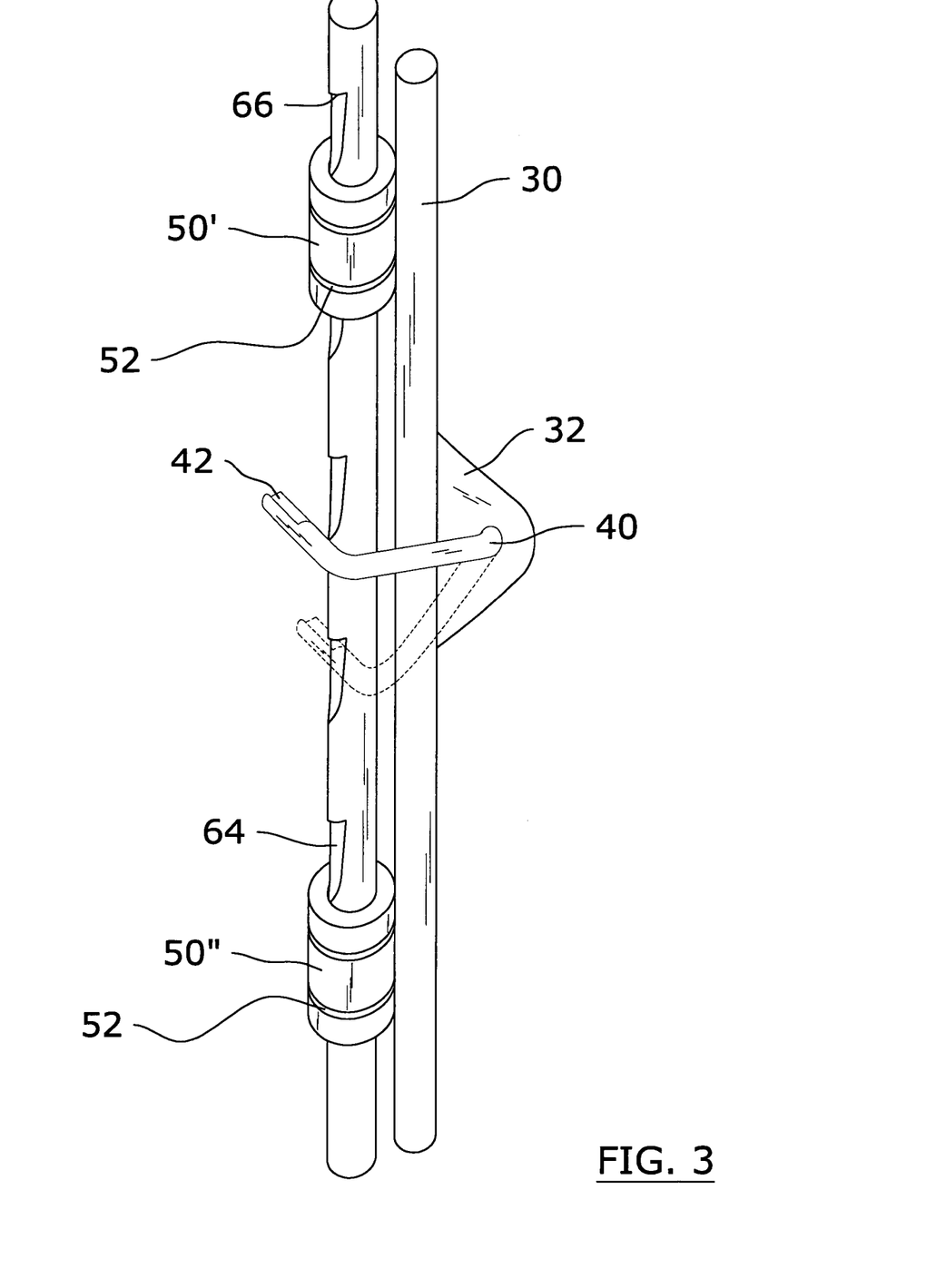
FIG. 3 is a magnified upper perspective view of the catch member.
Figure 4:
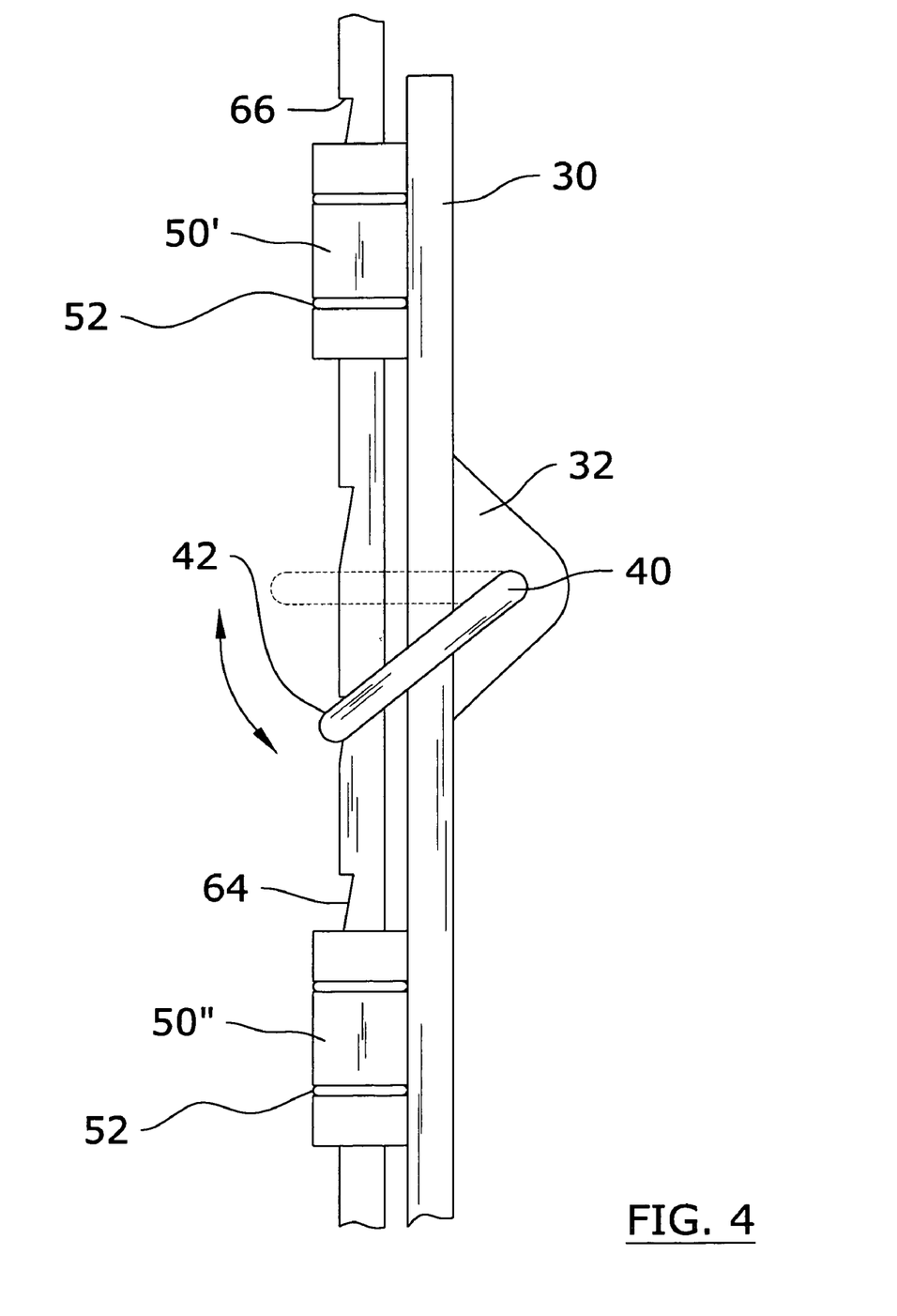
FIG. 4 is a side view of the catch member.

The catch member 40 has a U-shaped structure as best illustrated in FIGS. 1 and 2 of the drawings. The jaw 42 is an extended portion of the U-shaped structure facing the shaft 60 as best illustrated in FIGS. 1 through 3 of the drawings.

F. Stopper

The stopper 70 is attached to a lower end of the shaft 60. The stopper 70 preferably has a circular shape slightly smaller in size than the ice hole 12. The stopper 70 has a closed position (FIGS. 5d, 6b, 6c) and an open position (FIGS. 5b, 6a) with respect to an ice hole 12. The stopper 70 preferably includes a plurality of apertures 72 to reduce water resistance and to allow small ice particles to pass through when inserting the stopper 70 into the ice hole 12 and when drawing the stopper 70 upwardly within the ice hole 12.

G. Operation of Invention

Figure 6A:
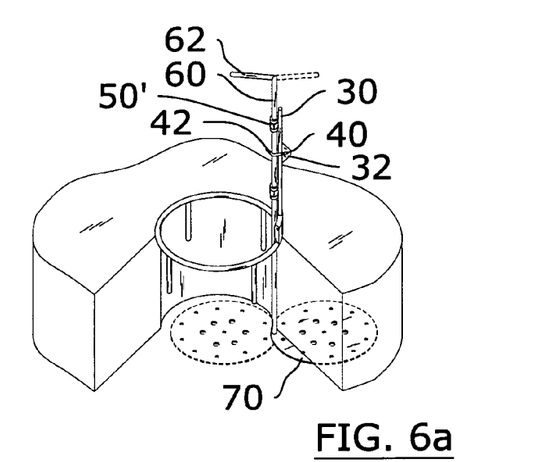
FIG. 6a is an upper perspective view of the present invention positioned within an ice hole in an open position.
Figure 6B:
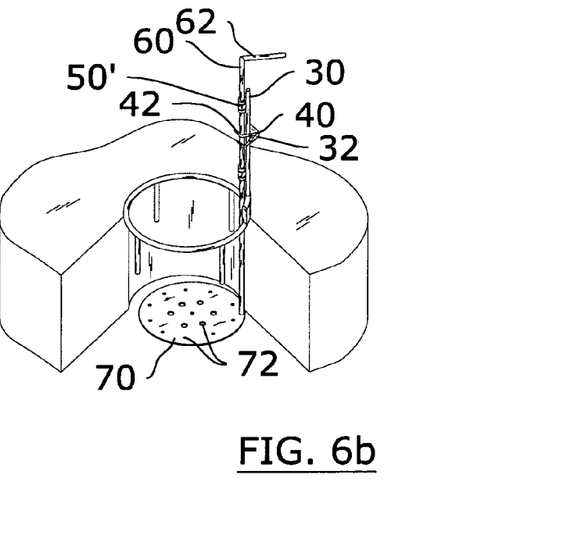
FIG. 6b is an upper perspective view of the present invention positioned within an ice hole in a closed position.
Figure 6C:
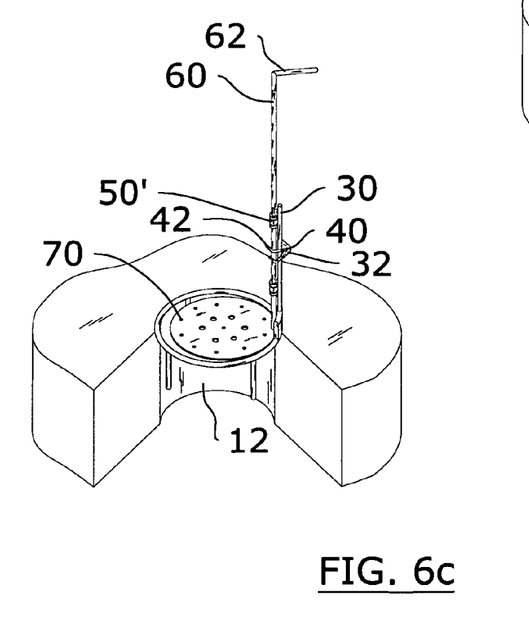
FIG. 6c is an upper perspective view of the present invention positioned within an ice hole in a raised position.
Figure 7A:
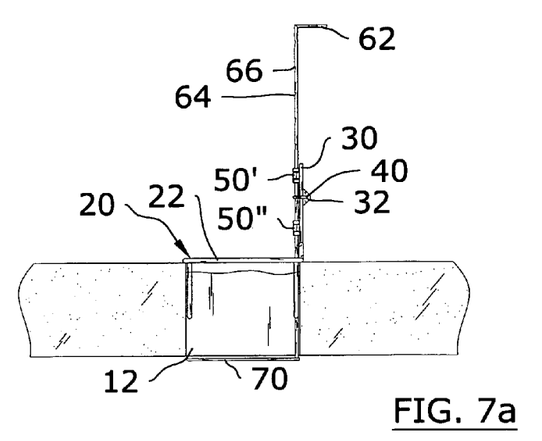
FIG. 7a is a side view of the present invention positioned within an ice hole having a first depth.
Figure 7B:
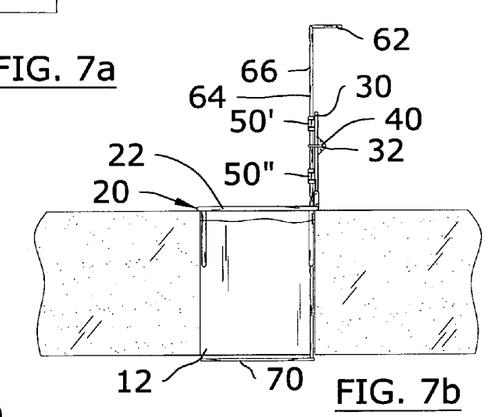
Figure 7C:
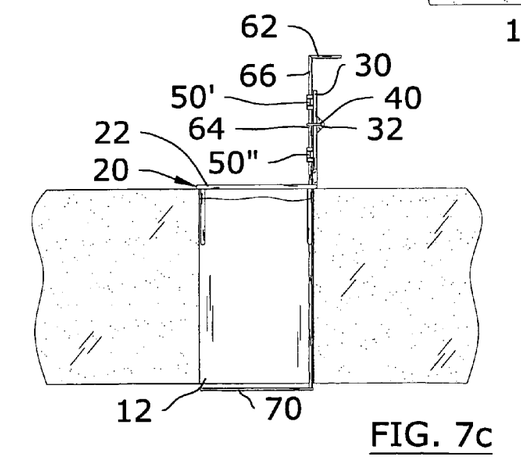
FIG. 7c is a side view of the present invention positioned within an ice hole having a third depth greater than the second depth shown in FIG. 7b.
Figure 8:
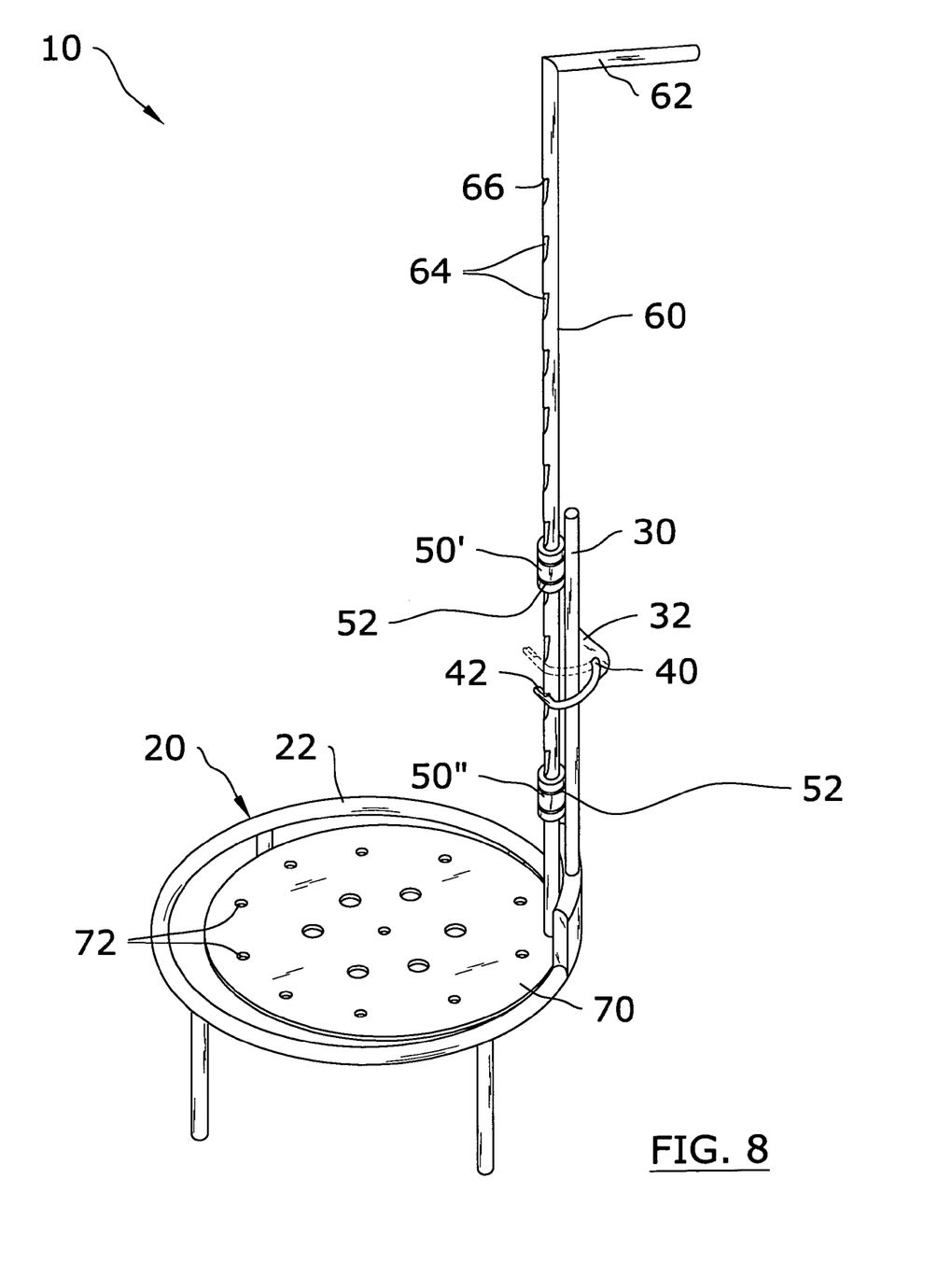

In use, the user first positions the base 20 with the prongs 24 into the ice hole 12 as shown in FIGS. 1 and 6c of the drawings. The user then extends the stopper 70 downwardly below the lower surface of the ice by manipulating the catch member 40 such that the shaft 60 is allowed to slide downwardly. Once the stopper 70 is slightly below the lower surface of the ice, the user then rotates the shaft 60 with the handle 62 causing the stopper 70 to pivot beneath the ice into an open position as shown in FIGS. 5b and 6a of the drawings. The friction of the guide member 50 retains the shaft 60 and the stopper 70 in the desired vertical position.

When a fish 14 is caught and drawn into the ice hole 12, the user then rotates the handle 62 causing the shaft 60 and the stopper 70 to rotate to the closed position as shown in FIGS. 5c and 5d of the drawings. The closed position effectively closes the ice hole 12 so that the fish 14 cannot pass through the ice hole 12 if accidentally lost above the ice or the hook should become dislodged. The user may continue to manually pull the fish 14 out of the ice hole 12 and/or simultaneously lift the stopper 70 upwardly within the hole to assist in the lifting of the fish 14 out of the ice hole 12. The catch notches 64 and the catch member 40 prevent the stopper 70 from accidentally falling through the ice hole 12 because of the weight of the fish 14. Once the fish 14 is properly removed, the above procedure is repeated to position the stopper 70 in the open position again.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A fish loss prevention system, comprising:
   a base, wherein said base is positionable in an ice hole;
   a support member extending upwardly from said base;
   a shaft slidably and rotatably attached to said support member;
   a catch member pivotally attached to said support member and selectively engaging said shaft; and
   a stopper attached to a lower end of said shaft, wherein said stopper has a closed position and an open position with respect to an ice hole;
   wherein said catch member has a jaw and wherein said shaft has a plurality of catch notches, wherein said jaw is capable of catchably engaging one of said plurality of catch notches, wherein said plurality of catch notches each taper upwardly and inwardly with a ceiling, wherein said jaw is capable of catchably engaging said ceiling.

2. The fish loss prevention system of claim 1, wherein said base includes a ring and a plurality of prongs extending downwardly from said ring, wherein said prongs are extendable into an ice hole.

3. The fish loss prevention system of claim 2, wherein said ring has an outer diameter greater than an inner diameter of an ice hole positioned about.

4. The fish loss prevention system of claim 2, wherein said ring has a circular shape.

5. The fish loss prevention system of claim 2, wherein said plurality of prongs are comprised of four prongs.

6. The fish loss prevention system of claim 1, wherein said support member includes a bracket, wherein said catch member is pivotally attached to said bracket.

7. The fish loss prevention system of claim 1, wherein said catch member allows said shaft to be lowered when said catch member is extended outwardly so as to not engage said catch notches.

8. The fish loss prevention system of claim 1, wherein said shaft includes a handle at an upper end of said shaft.

9. The fish loss prevention system of claim 1, wherein said catch member has a U-shaped structure, wherein said jaw is an extended portion of said U-shaped structure facing said shaft.

10. The fish loss prevention system of claim 1, including at least one guide member attached to said support member and slidably receiving said shaft.

11. The fish loss prevention system of claim 10, wherein said at least one guide member is comprised of an upper guide member and a lower guide member.

12. The fish loss prevention system of claim 10, wherein said at least one guide member includes a rubber seal on an interior portion thereof that receives said shaft.

13. The fish loss prevention system of claim 1, wherein said stopper includes a plurality of apertures.

14. A fish loss prevention system, comprising:
   a base, wherein said base is positionable in an ice hole, wherein said base includes a ring and a plurality of prongs extending downwardly from said ring; wherein said prongs are extendable into an ice hole, and wherein said ring has an outer diameter greater than an inner diameter of an ice hole positioned about;
   a support member extending upwardly from said base;
   at least one guide member attached to said support member;
   a bracket attached to said support member;
   a shaft slidably and rotatably attached to said at least one guide member;
   a handle extending from an upper end of said shaft;
   a catch member pivotally attached to said bracket and selectively engaging said shaft, wherein said catch member has a jaw and wherein said shaft has a plurality of catch notches, wherein said jaw is capable of catchably engaging one of said plurality of catch notches, wherein said plurality of catch notches each taper upwardly and inwardly with a ceiling, wherein said jaw is capable of catchably engaging said ceiling, wherein said catch member allows said shaft to be lowered when said catch member is extended outwardly so as to not engage said catch notches; and
   a stopper attached to a lower end of said shaft, wherein said stopper has a closed position and an open position with respect to an ice hole, wherein said stopper includes a plurality of apertures.

15. The fish loss prevention system of claim 14, wherein said ring has a circular shape and wherein said plurality of prongs are comprised of four prongs.

16. The fish loss prevention system of claim 14, wherein said catch member has a U-shaped structure, wherein said jaw is an extended portion of said U-shaped structure facing said shaft.

17. The fish loss prevention system of claim 14, wherein said at least one guide member is comprised of an upper guide member and a lower guide member.

18. The fish loss prevention system of claim 14, wherein said at least one guide member includes a rubber seal on an interior portion thereof that receives said shaft.

* * * * *